United States Patent
Shafique et al.

(10) Patent No.: US 7,654,088 B2
(45) Date of Patent: Feb. 2, 2010

(54) DUAL CONDUIT FUEL MANIFOLD FOR GAS TURBINE ENGINE

(75) Inventors: Harris Shafique, Longueuil (CA); Lev Alexander Prociw, Elmira (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 719 days.

(21) Appl. No.: 10/788,040

(22) Filed: Feb. 27, 2004

(65) Prior Publication Data

US 2005/0188699 A1   Sep. 1, 2005

(51) Int. Cl.
F02C 1/00 (2006.01)
F02G 3/00 (2006.01)

(52) U.S. Cl. .......................... 60/739; 60/747

(58) Field of Classification Search .............. 60/739, 60/740, 746, 747
See application file for complete search history.

(56) References Cited

U.S. PATENT DOCUMENTS

| | | | |
|---|---|---|---|
| 2,151,540 A | | 3/1939 | Varga |
| 2,690,648 A | * | 10/1954 | Hiscox et al. ................ 60/739 |
| 2,946,185 A | | 7/1960 | Bayar |
| 3,213,523 A | | 10/1965 | Boehler |
| 3,472,025 A | | 10/1969 | Simmons et al |
| 3,768,251 A | * | 10/1973 | Camboulives et al. ......... 60/796 |
| 3,774,851 A | * | 11/1973 | Simmons .................... 239/551 |
| 3,949,775 A | * | 4/1976 | Cornell .................. 137/118.02 |
| 3,991,561 A | * | 11/1976 | Leto ........................ 60/39.463 |
| 3,995,660 A | * | 12/1976 | Kast ....................... 137/625.48 |
| 4,100,733 A | | 7/1978 | Striebel et al. |
| 4,322,945 A | | 4/1982 | Peterson et al. |
| 4,402,184 A | * | 9/1983 | Faulkner et al. .............. 60/739 |
| 4,404,806 A | * | 9/1983 | Bell et al. .................... 60/737 |
| 5,031,407 A | * | 7/1991 | Zaremba et al. .............. 60/739 |
| 5,036,657 A | * | 8/1991 | Seto et al. ................ 60/39.281 |
| 5,177,955 A | * | 1/1993 | Shekleton .................... 60/804 |
| 5,211,005 A | * | 5/1993 | Hovnanian ................... 60/800 |
| 5,231,833 A | * | 8/1993 | MacLean et al. ............. 60/734 |
| 5,253,471 A | | 10/1993 | Richardson |
| 5,271,219 A | | 12/1993 | Richardson |
| 5,361,586 A | * | 11/1994 | McWhirter et al. ........... 60/737 |
| 5,396,759 A | | 3/1995 | Richardson |
| 5,400,968 A | | 3/1995 | Sood |
| 5,419,115 A | | 5/1995 | Butler et al. |
| 5,423,178 A | | 6/1995 | Mains |
| 5,570,580 A | | 11/1996 | Mains |
| 5,579,645 A | | 12/1996 | Prociw et al. |
| 5,598,696 A | | 2/1997 | Stotts |
| 5,653,109 A | * | 8/1997 | Overton et al. ............... 60/739 |
| 5,771,696 A | * | 6/1998 | Hansel et al. ................. 60/739 |
| 5,848,525 A | * | 12/1998 | Spencer ................... 60/39.281 |
| 5,884,483 A | * | 3/1999 | Munro ........................ 60/739 |

(Continued)

FOREIGN PATENT DOCUMENTS

CA   1013153   7/1977

(Continued)

*Primary Examiner*—William H Rodríguez
(74) *Attorney, Agent, or Firm*—Ogilvy Renault LLP

(57) ABSTRACT

Fuel conduit systems for internal installation in a gas turbine engine are provided which are low cost and easy to manufacture. First and second members co-operate to provide a channel to define a discrete fuel carrying conduit. The direction of fuel flow can be adapted to provide desired cooling effect.

16 Claims, 7 Drawing Sheets

U.S. PATENT DOCUMENTS

| | | | | |
|---|---|---|---|---|
| 5,956,955 | A | 9/1999 | Schmid | |
| 5,983,642 | A | 11/1999 | Parker et al. | |
| 5,996,335 | A | 12/1999 | Ebel | |
| 6,038,852 | A * | 3/2000 | Celi | 60/761 |
| 6,082,113 | A * | 7/2000 | Prociw et al. | 60/748 |
| 6,109,038 | A * | 8/2000 | Sharifi et al. | 60/737 |
| 6,141,968 | A | 11/2000 | Gates et al. | |
| 6,149,075 | A | 11/2000 | Moertle et al. | |
| 6,240,732 | B1 * | 6/2001 | Allan | 60/739 |
| 6,256,995 | B1 | 7/2001 | Sampath et al. | |
| 6,463,739 | B1 | 10/2002 | Mueller et al. | |
| 6,761,035 | B1 | 7/2004 | Mueller | |
| 6,857,272 | B2 * | 2/2005 | Summerfield et al. | 60/739 |
| 7,028,484 | B2 * | 4/2006 | Prociw et al. | 60/772 |
| 2003/0014979 | A1 * | 1/2003 | Summerfield et al. | 60/776 |
| 2004/0040306 | A1 * | 3/2004 | Prociw et al. | 60/740 |
| 2006/0156733 | A1 * | 7/2006 | Prociw et al. | 60/776 |
| 2006/0218926 | A1 * | 10/2006 | Prociw et al. | 60/739 |
| 2006/0260317 | A1 * | 11/2006 | Prociw et al. | 60/739 |

FOREIGN PATENT DOCUMENTS

CA 2307186 5/1999

* cited by examiner

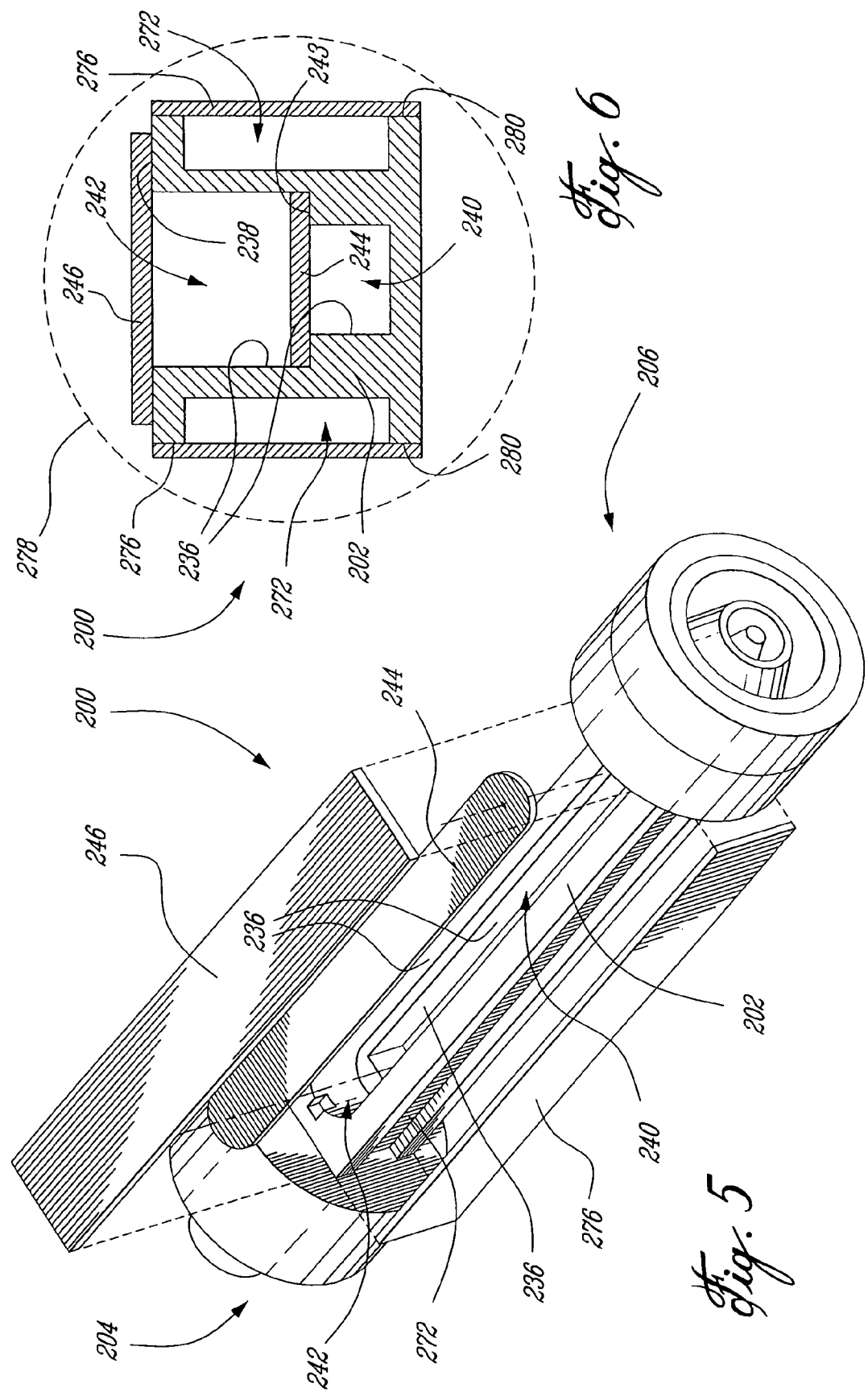

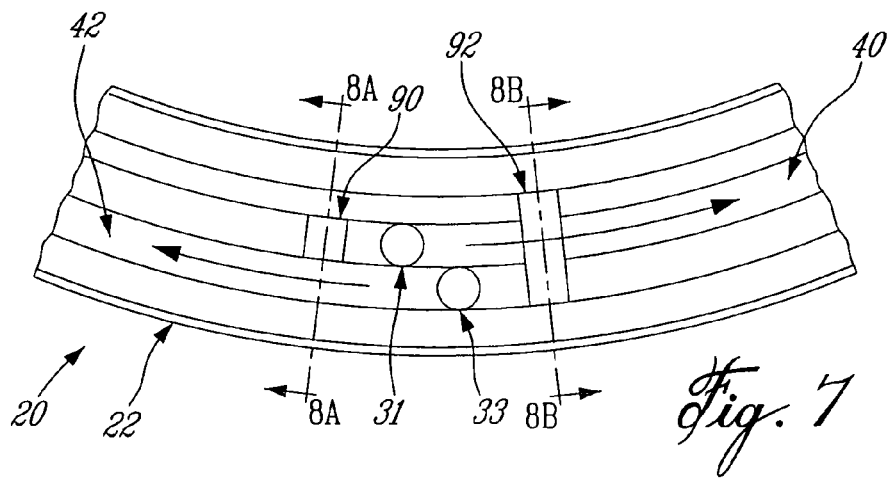
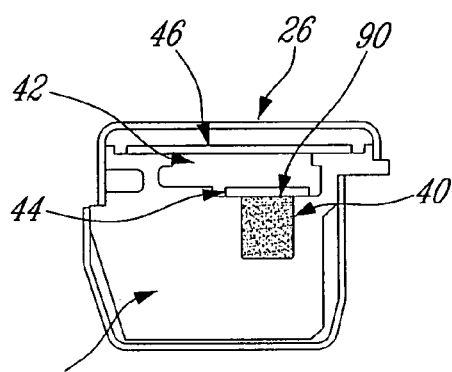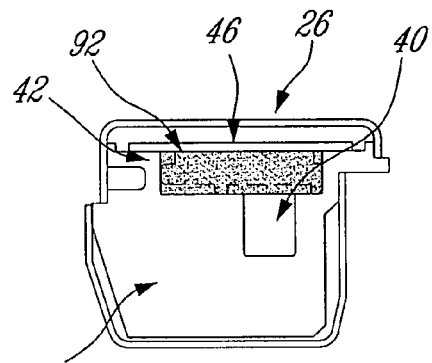
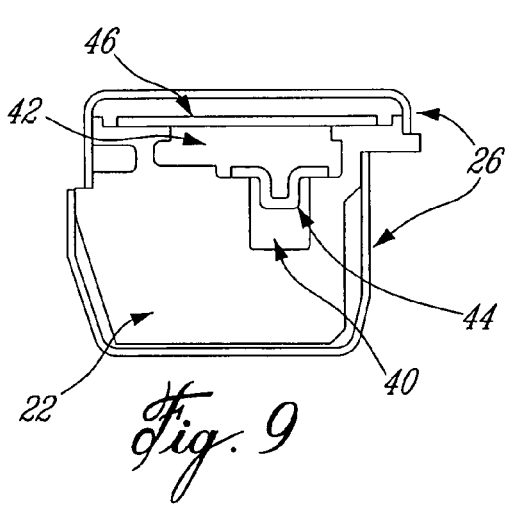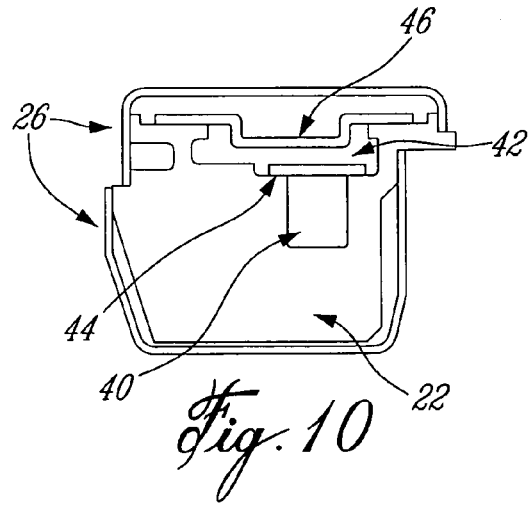

DUAL CONDUIT FUEL MANIFOLD FOR GAS TURBINE ENGINE

TECHNICAL FIELD

The present invention relates generally to gas turbine engines, and more particularly to fuel manifolds, nozzle stems and the like.

BACKGROUND OF THE INVENTION

Fuel nozzles which supply fuel to a combustion chamber in a gas turbine engine comprise a plurality of injector assemblies connected to a fuel manifold via nozzle stems.

Some conventional nozzle systems define dual adjacent fuel passages, sometimes concentrically disposed within an outer tube. In an effort to provide a dual passage stem member which is relatively simpler and more economical to manufacture, it is also known to use a stem comprised of a solid piece of material having adjacent slotted fuel conduits. However, prior art multiple channel systems are cumbersome, difficult to manufacture and maintain, and heavy. Accordingly, improvements are desirable.

SUMMARY OF THE INVENTION

It is an object of the present invention to provide an improved fuel system.

Therefore, in accordance with one aspect of the present invention, there is provided a fuel manifold for providing fuel to a gas turbine engine fuel nozzle system, the manifold comprising a first fuel conduit defined in the manifold, the conduit extending from a first inlet to a first end and communicating with a plurality of fuel nozzles about the manifold, a second fuel conduit defined in the manifold adjacent the first conduit, the conduit extending from a second inlet to a second end and independently communicating with the plurality of fuel nozzles, wherein the conduits are arranged such that in use fuel flowing in the first conduit is travelling relative to the manifold in a direction which different than a fuel flow direction in the second conduit.

In accordance with another aspect, there is also provided an internal fuel manifold for a gas turbine engine comprising a manifold body adapted for installation inside a gas turbine engine, the body including at least one fuel transporting conduit defined therein and adapted to deliver fuel to a plurality of fuel nozzles, and a heat shield assembly adapted to surround the manifold body, the assembly adapted to enclose an air space between the assembly and the manifold body, the air space sized and adapted to provide a predetermined thermal insulation to the manifold body.

In accordance with another aspect, there is also provided a gas turbine fuel nozzle assembly comprising a stem having a manifold end and a tip end, a nozzle tip communicating with the tip end, and at least one sheet metal member fixed to the outside of the stem, the sheet metal member having a shape adapted to define a fuel conduit between the stem and the sheet metal member, the fuel conduit communicating with a source of fuel and the nozzle tip.

Other aspects of the invention will also be apparent.

BRIEF DESCRIPTION OF THE DRAWINGS

Further features and advantages of the present invention will become apparent from the following detailed description, taken in combination with the appended drawings, in which:

FIG. 5 is an exploded isometric view of a fuel nozzle stem according to the present invention.

FIG. 6 is a cross-sectional view of the nested channel fuel nozzle stem of FIG. 5.

FIG. 7 is cross-sectional top view of a portion of an alternate embodiment of the manifold of FIG. 1.

FIGS. 8A and 8B are sectional views, taken at the two indicated locations of the manifold of FIG. 7.

FIGS. 9 and 10 are sectional views, taken at two different (unindicated) locations of the manifold of FIG. 7.

DETAILED DESCRIPTION OF THE PREFERRED EMBODIMENT

Figure 1:
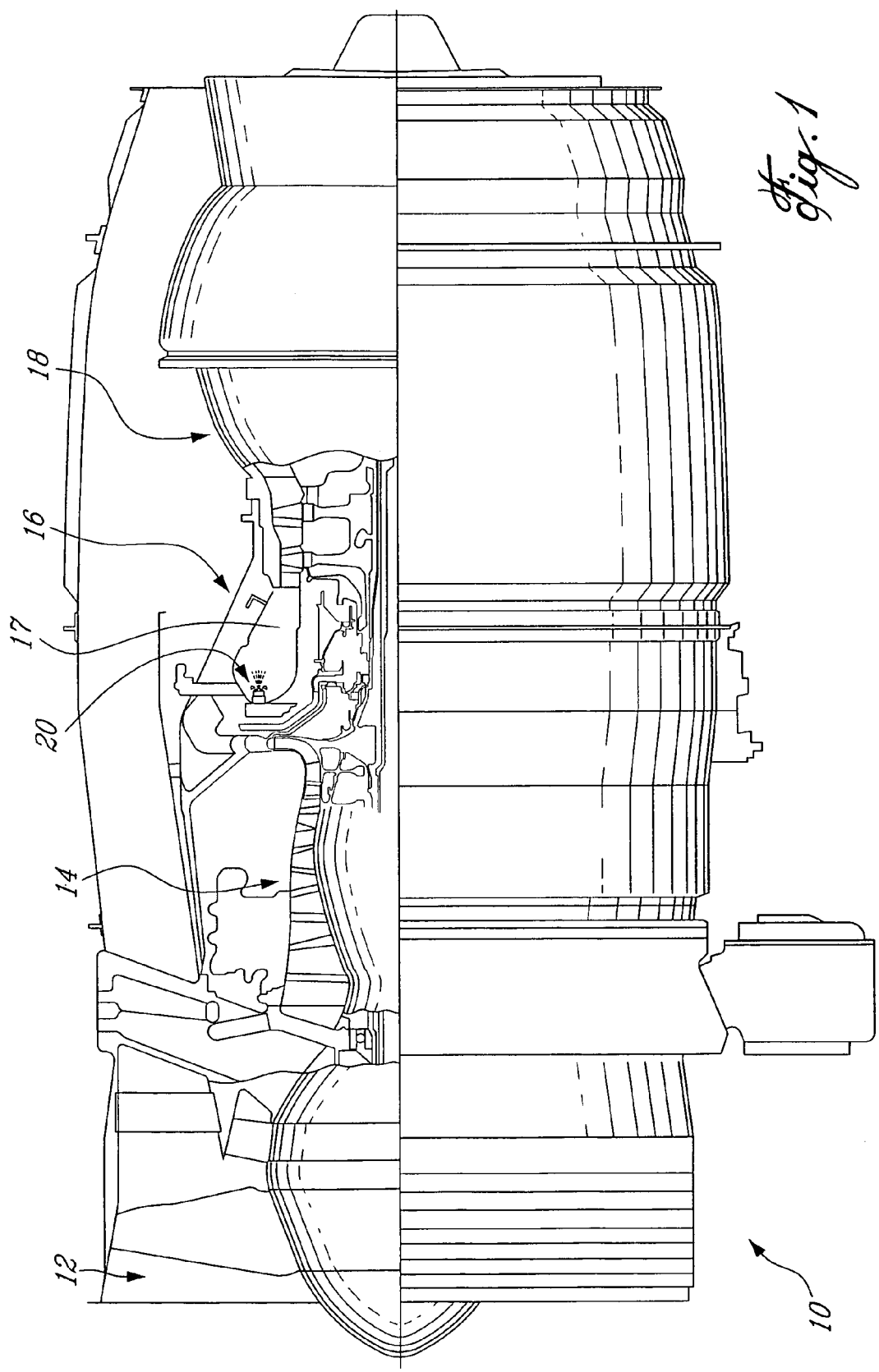
FIG. 1 is a cross-sectional view of a gas turbine engine comprising a fuel injection system according to the present invention.

FIG. 1 illustrates a gas turbine engine 10 generally comprising, in serial flow communication, a fan 12 through which ambient air is propelled, a multistage compressor section 14 for pressurizing the air, a combustion section 16 in which the compressed air is mixed with fuel atomized into a combustion chamber 17 by a fuel injection system comprising a fuel injection nozzle assembly 20, the mixture being subsequently ignited for generating hot combustion gases before passing through a turbine section 18 for extracting energy from the combustion gases.

Figure 2:
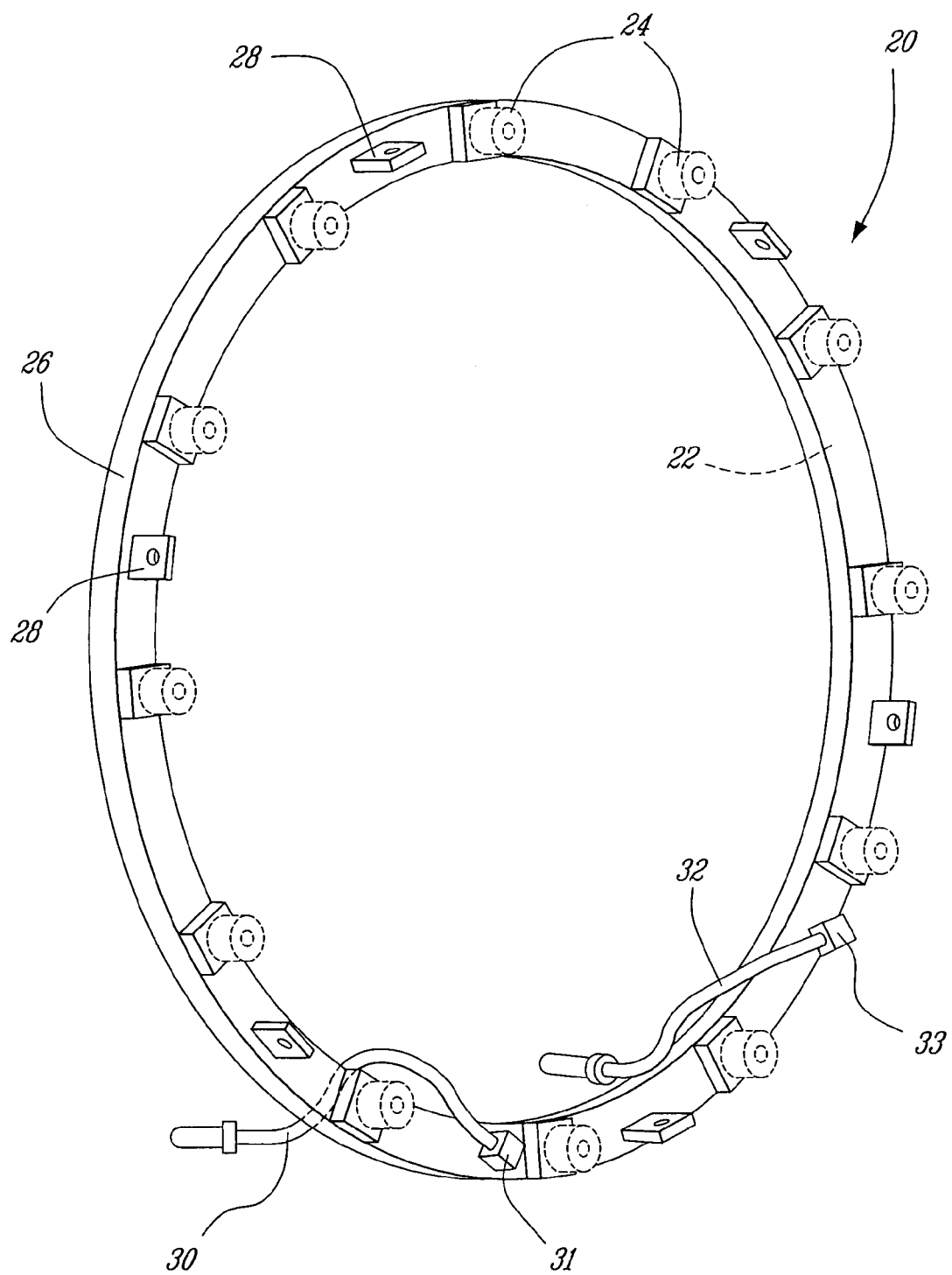
FIG. 2 is a perspective view of a first embodiment of a fuel injection system according to the present invention comprising an annular, nested channel fuel manifold ring.

Referring to FIG. 2, the fuel injection nozzle assembly 20 comprises an annular fuel manifold ring 22 generally disposed within the combustion chamber 17 of the engine, and mounted via several integral attachment lugs 28 for fixing the annular ring 22 to an appropriate support structure. The annular fuel manifold ring 22 comprises a plurality of fuel injector spray tip assemblies 24 thereon, which atomize the fuel for combustion. The exterior of the annular ring 22 comprises an outer heat shield 26 covering the ring. This provides the fuel manifold ring thermal protection from the high temperature environment of the combustion chamber. A primary fuel inlet pipe 30 and a secondary fuel inlet pipe 32, via inlets 31 and 33, respectively, provide dual though independent fuel feeds to manifold 22, which then distributes the two fuel supplies to the spray tip assemblies. The spray tip assemblies 24 are directly mounted to the annular fuel manifold ring, without requiring conventionally used nozzle stems which are traditionally required to link, in fluid flow communication, the spray tip assemblies with each distinct fuel manifold for each fuel inlet source. The above features are generally known in the art.

Figure 3:
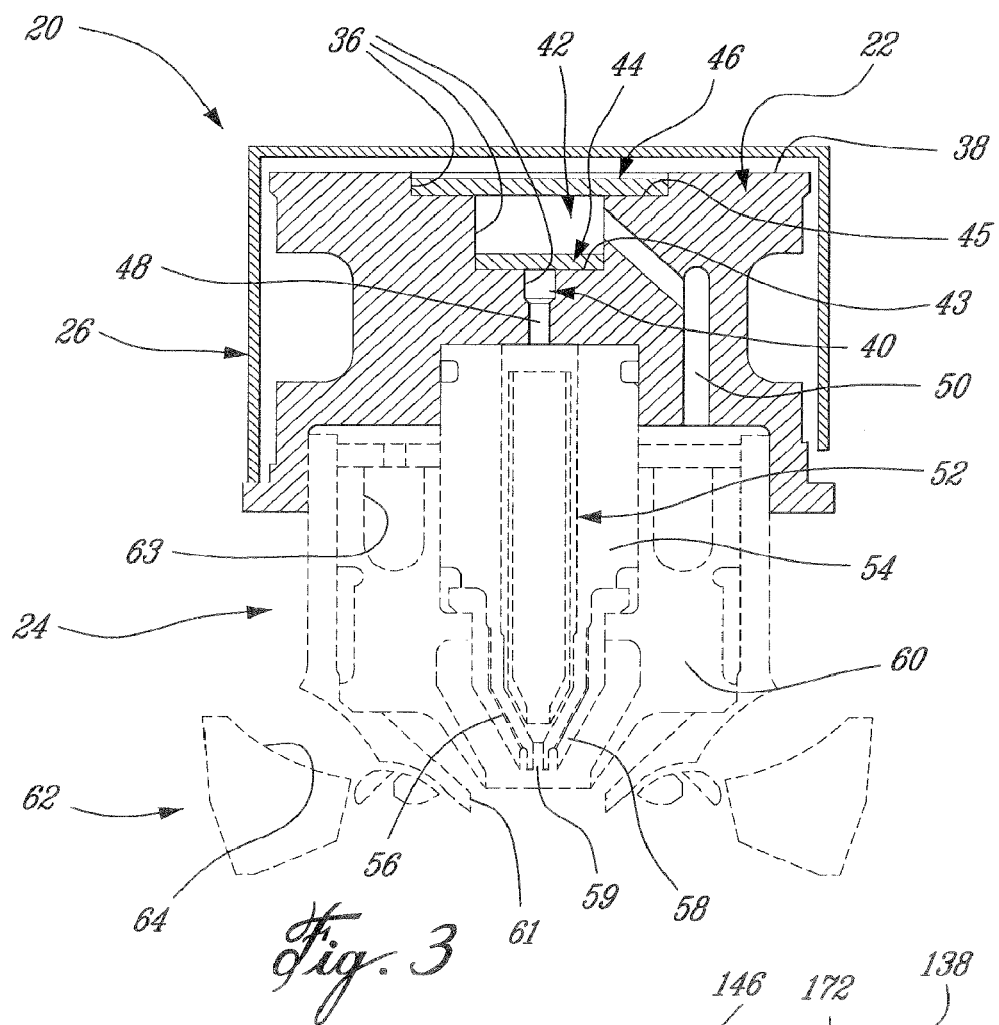
FIG. 3 is a cross-sectional view of the nested channel fuel manifold ring of FIG. 2.

Referring now to FIG. 3 more clearly showing the details of the fuel injection nozzle assembly 20 according to the present invention, the annular fuel manifold ring 22 is preferably formed from a single solid piece of material and comprises a single stepped channel 36 formed in an outer peripheral surface 38 of the manifold ring which is covered by a protective outer heat shield 26. The stepped channel 36 is preferably formed by a single machining operation, for example by a single milling or routing step using a multi-diametered bit of a predetermined size to create the number and size of the nested slots comprising the entire stepped channel 36. Once provided, as described below, the nested slots, defined by the stepped slot that is machined, or otherwise formed, in the fuel manifold ring, create annular fuel galleries which permit circumferential distribution of independently controllable fuel supplies to be fed to each spray tip assembly.

The annular stepped channel 36 comprises at least two nested fuel conduits; namely a primary nested fuel conduit 40 and secondary nested fuel conduit 42. The annular primary fuel conduit is located in the manifold ring closest to the spray tip assemblies, and preferably (to facilitate manufacture) is much smaller in cross-sectional area than the annular secondary nested fuel conduit 42, which opens immediately to the peripheral surface 38 in which the stepped channel 36 is formed. A first inner sealing member or plate 44, sized such that it fits within the secondary conduit portion of the stepped channel and is larger than the width of the primary conduit (i.e. to seal it), is fixed against a first shoulder 43 formed in the stepped channel between the primary and secondary nested conduits, by way of brazing or another fastening/sealing method. The first inner sealing plate 44 for the annular fuel manifold ring 22, is preferably also an annular ring plate, substantially extending around the full circumference of manifold ring. An outer stepped channel sealing member or plate 46 is similarly fixed to the fuel manifold ring 22 by brazing or other similar fastening method, against a second shoulder 45 formed within the stepped channel for receiving the annular outer sealing plate ring 46 abutted therein. The outer sealing ring plate 46 could also be brazed directly to the outer peripheral surface 38 of the manifold ring, without the need for the second shoulder 45 in the stepped channel 36. The two sealing plates thereby divide the single stepped channel 38 into two discrete, nested fuel conduits that are sealed from one another and which can supply independent fuel supplies to the spray tip assemblies, primary nested fuel conduit 40 and secondary nested fuel conduit 42. This therefore permits the use of a single-piece fuel manifold, having at least two discrete fuel galleries formed therein in a simple and cost effective manner. This eliminates the need for employing fuel nozzle stems and conventional fuel nozzle injector arrays comprising hundreds of sub-components merely to connect an exteriorly located fuel manifold to the spray tip assemblies in the combustion chamber.

The primary and secondary annular nested fuel conduits 40 and 42 permit circumferential distribution of the primary and secondary fuel supply around the fuel manifold ring. At the location of each spray tip assembly 24 mounted to the annular manifold ring 22, fuel outlet passage holes are formed, by drilling or otherwise, in the manifold ring body substantially perpendicularly to the outer peripheral surface 38, to enable fluid flow communication between the nested fuel conduits and the spray tip assembly 24. Specifically, primary fuel conduit outlet passage 48 permits primary fuel flow from the primary fuel conduit 40 to be fed into the primary distributor 54 of the spray tip assembly, and secondary fuel conduit outlet passage 50 permits secondary fuel flow from the secondary fuel conduit 42 to be fed into the annular secondary fuel swirling cavity 63 of the spray tip assembly 24.

Such spray tip assemblies typically also comprise a valve member 52 disposed within the primary distributor 54 for regulating primary fuel flow through a primary cone 56, protected by a primary heat shield 58, before being ejected by a primary fuel nozzle tip 59. A secondary fuel swirler 60 disposed substantially concentrically about the primary distributor, comprises an annular secondary fuel swirling cavity, which swirls the secondary fuel flow before it is ejected through annular secondary fuel nozzle tip 61. An outer air swirler 62 comprises a plurality of circumferentially spaced air passages 64 which convey air flow for blending with the primary and secondary fuel sprays issuing from the primary and secondary spray orifices, 59 and 61 respectively, of the spray tip assembly.

Figure 4:
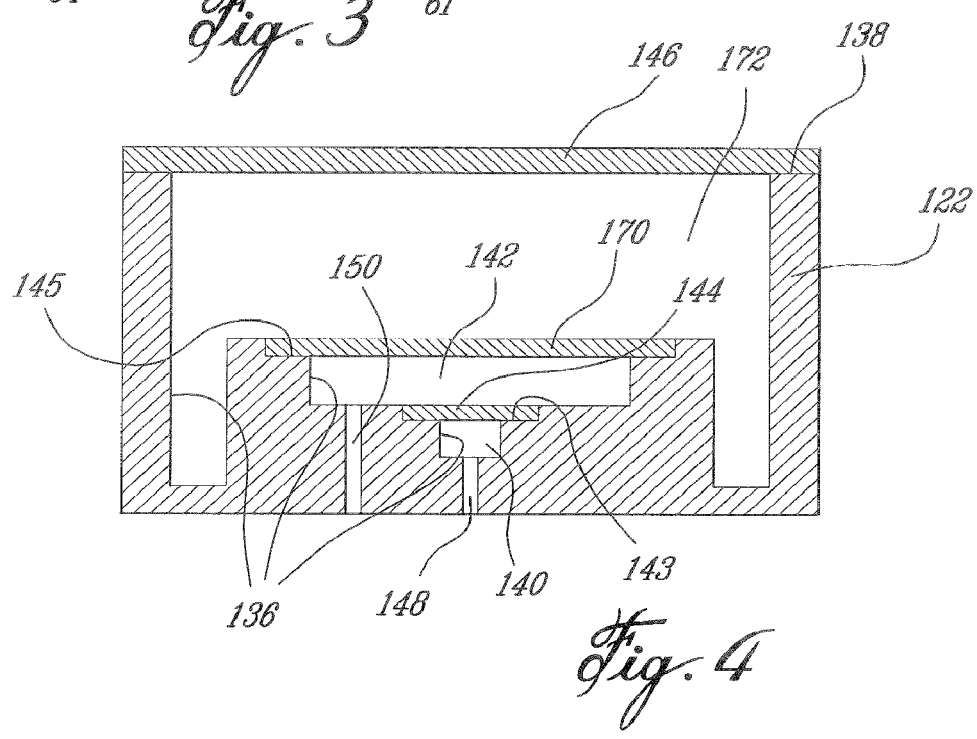
FIG. 4 is a cross-sectional view of an alternate fuel manifold ring having an additional nested channel.

Referring to FIG. 4, this embodiment of an annular fuel manifold ring 122 comprises an alternately-shaped stepped channel 136 machined in the solid, one-piece material of the manifold ring. The stepped channel 136 comprises an additional or auxiliary channel 172, therein. As above, a primary nested fuel conduit 140 is formed by fixing the first inner annular sealing member or plate 144 against a first shoulder 143, thereby dividing the primary fuel conduit 140 from the secondary nested fuel conduit 142. The secondary nested fuel conduit 142 is enclosed by a second inner sealing member or plate 170 abutted with, and fixed against, second shoulder 145 within the stepped channel 136. As described above, although several attachment and sealing methods for fixing the sealing plates to the manifold ring can be used, they are preferably brazed thereto. The annular auxiliary channel 172 is further axially enclosed by an outer sealing member or plate 146, fixed against the outer peripheral surface 138 of the annular fuel manifold ring 122. As described above, a primary conduit outlet passage 148 and a secondary conduit outlet passage 150, formed in the manifold ring perpendicularly to the outer peripheral surface 138 at predetermined circumferential locations of the manifold ring corresponding to location of the spray tip assemblies, provide dual independent fuel feeds to each spray tip assembly.

The auxiliary channel 172 can be used to carry a coolant, such as for example recirculated fuel, which will draw heat from the ring. The coolant flow in the auxiliary channel 172 is independent of the quantity of fuel being delivered to the engine. This is particularly needed during low power operation, when less fuel flows through the conduits of the manifold, and therefore more heat is absorbed from the combustion chamber by the entire manifold ring. This reduces fuel coking within the fuel manifold, which can occur if sufficient fuel flow is not maintained to cool the manifold ring. Each conduit, namely the primary fuel conduit 140, the secondary fuel conduit 142 and the auxiliary cooling conduit 172, each has its own inlet feed line, such that the fuel rates and the coolant flow rate can be independently controlled. Independent control of the primary and secondary fuel flows and independent feeding of each spray tip from the annular conduits providing circumferential fuel distribution, also permits fuel staging, wherein specific amounts of fuel are partitioned to specific circumferential locations of the combustion chamber to enhance ignition or to control emissions.

The present invention may also be used to provide multiple nested channels for providing discrete fuel conduits in a fuel nozzle stem.

Referring to FIG. 5 and FIG. 6, a fuel nozzle stem 200 comprises a central stem body 202 and a stem inlet end 204 and a stem outlet end 206. A stepped channel 23 is formed in a first outer surface 238 of the stem body 202. The channel is divided by an inner sealing member or plate 244, abutted with and preferably brazed to, shoulder 243 within the stepped channel, thereby defining a primary nested fuel conduit 240 and a preferably larger secondary nested fuel conduit 242. Unlike the nested fuel conduits described previously, the primary and secondary conduits 240 and 242 are substantially linear, rather than being annular. The secondary nested fuel conduit 242 is enclosed by an outer sealing member or plate 246, preferably fixed to the outer surface 238 of the stem body again preferably by brazing. The primary and secondary fuel conduits hereby provide discrete fuel flow passages between the inlet end 204 and the outlet end 206 of the stem, which are adapted to be engaged with a fuel manifold adapter and a nozzle spray tip assembly, respectively. This permits at least two discrete fuel flows through the nozzle stem to a pray tip assembly. Typically, the entire fuel nozzle stem 200 is fitted within a surrounding cylindrical outer shield 278, which is can be brazed to the stem member to provide an element of heat protection. The stem body 202 can also comprise auxiliary cooling channels 272 formed therein according to the present invention. In the example shown, the auxiliary cooling channels 272 are on opposing sides of the stem body in outer lateral surfaces 280 of the stem body, substantially perpendicular to the first outer surface 238 with the stepped channel 236 formed therein. Auxiliary channel outer sealing plates enclose the auxiliary cooling channels. The two opposing auxiliary coolant channels 272 are in fluid flow communication at the outlet end 206 of the stem, such that they can provide inlet and outlet passages for coolant flowing through to stem to provide cooling thereof.

Figure 11:
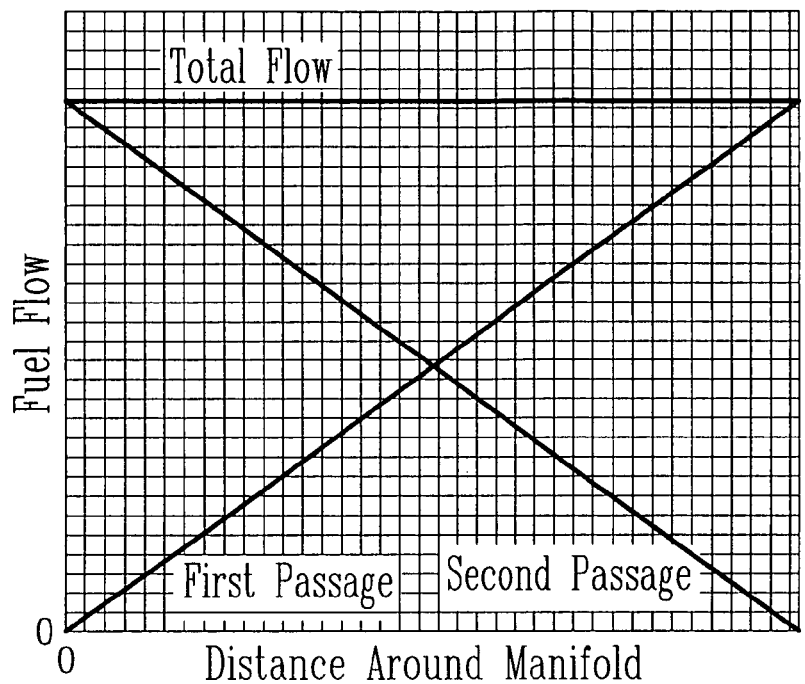
FIGS. 11 and 12 are graphs respectively illustrating Fuel Distribution and Wetted Wall Temperature versus Distance around the manifold of FIG. 7.
Figure 12:
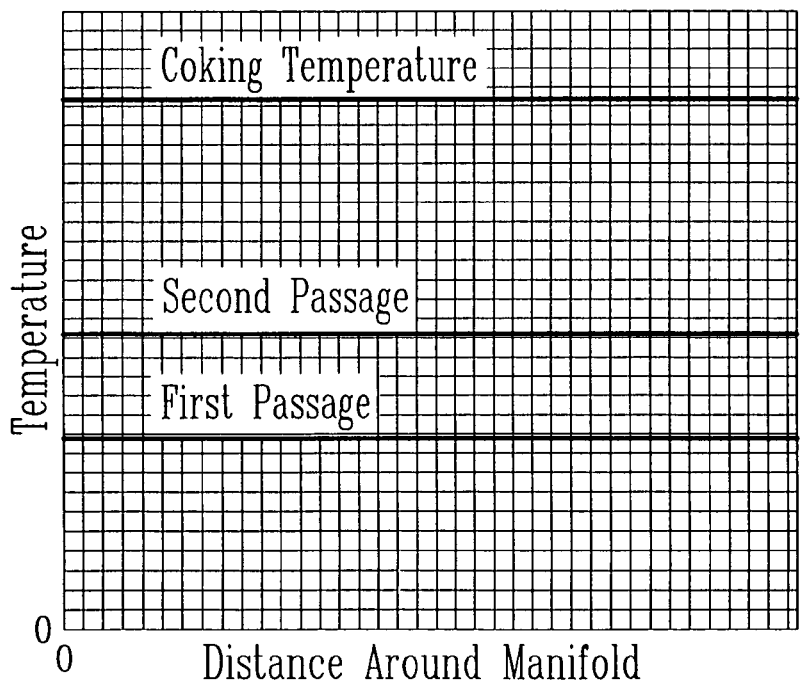

An internal fuel manifold of the type described above may, by reason of its internal position in the engine, become subject to very high wetted wall temperatures, which can lead to fuel break down and contamination (i.e. coking) of the fuel nozzle tips. However, referring now to FIG. 7, the fuel passing through the manifold 22 can be used to effectively cool the body of manifold 22. Cooling is optimized in this embodiment by directing the flows through passages 40 and 42 so that they have counter flowing fuel directions (i.e. one clockwise and one counter-clockwise). Fuel enters the channel 40 and 42 via inlets 31 and 33, respectively. Channel-blocking dams 90 and 92 are provided on alternate sides of inlets 31 and 32 such that fuel flows are forced in opposite directions (i.e. in the directions of the arrows) in channels 40 and 42. In doing so, the total fuel flow at any point around the manifold can be held almost constant ensuring optimum heat transfer rates at any point around the manifold 22. As demonstrated in FIG. 11, at an area where is the fuel flow is low in one channel will have high fuel flow in the other channel, and vice versa. The result is low and almost equal wetted wall temperatures around the full circumference of the manifold, as can be seen in FIG. 12. This offers a significant improvement in thermal management over a manifold 22 in which fuel entering each channel (40, 42) of the manifold 22 is permitted to split and flow both directions around the manifold, which results in low fuel flow at the side of the manifold away from the inlets, which may result in reduced cooling, higher wetted wall temperatures and possible contamination of the fuel passages.

Referring again to FIGS. 7 and 2, as fuel flow makes its way either clockwise or counterclockwise, as the case may be, around the manifold 22, it is discharged little-by-little into successive fuel nozzles 24. As fuel is discharged, the resulting fuel flow rate in the channel is progressively reduced downstream of each nozzle 24. The reduced flow rate results in a lower bulk fuel velocity and therefore heat transfer rates will also reduced, which may be undesirable. However, if the size of channels 40 and 42 can be progressively reduced to maintain velocities, and thus heat transfer rates, as flow volume decreases. This may be done by varying the channel widths and/or depths of the channels 40, 42 of FIGS. 8A and 8B. Alternately and preferably, however, the shape of cover plates 44 and 46 may be varied as shown in FIGS. 9 and 10. Sheet metal forming operation may be used to vary the cover plate shape to reduce (or increase) the passage area, as desired, to control flow rates.

Referring still to FIGS. 8A and 8B through 10, in another aspect of the invention, heat shields 26 may be provided which are formed to provide an enclosed air space between the manifold 22 and the heat shield 26. The size of the air gap is preferably selected to provide adequate thermal insulation to minimize the amount of heat transfer from the engine into the manifold and fuel.

Throughout this disclosure, the same reference numerals are used to refer to like or analogous features in the description and figures. Reference numerals in additional embodiments are incremented in 100s, for convenience, however the reader will understand that features having references numerals 104, 204, 304, etc. will have the same or analogous functions, as described elsewhere in this application.

Figure 13:
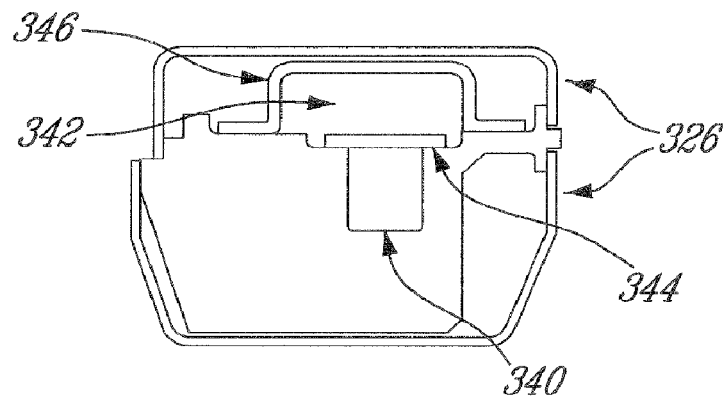
FIG. 13 is a cross-sectional view of an alternate embodiment of the manifold of FIG. 2.
Figure 14:
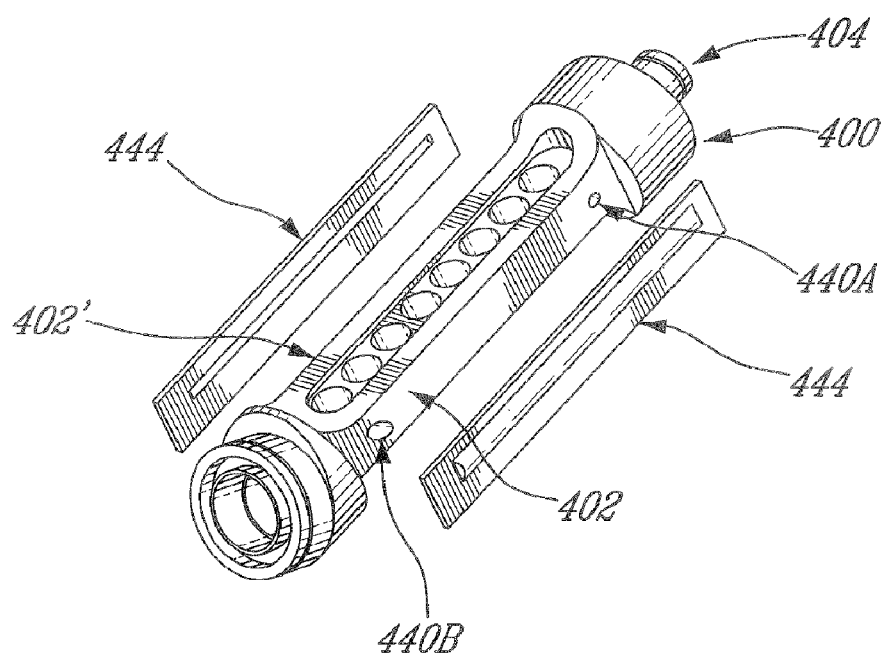
FIG. 14 is an exploded isometric view of another fuel nozzle stem in accordance with the present invention.

While the above description constitutes the preferred embodiments, it will be appreciated that the present invention is susceptible to modification and change without departing from the fair meaning of the accompanying claims. For example, the present invention can offer reliability and weight benefits in any gas turbine engine application wherever multiple hydraulic or other fluid conduits are required or desired. Further instead of blocking a portion of an otherwise contiguous channel, as in FIG. 7, an unidirectional channel may be provided. Although counter-rotating flows are preferred, other fuel flow may be used to provide desired heat transfer rates. Also, in place of the stepped construction of the channel, other configurations will be apparent to those skilled in the art. For example, referring to FIGS. 13 and 14, channels 342 and 340 are, respectively provided between cover plat 346 and 444 and their associated surfaces 344 and 402. In the case of nozzle stem 400 in FIG. 14, this advantageously permits weight-reduction holes 402' to be provided, as fuel is moved outboard of the nozzle stem 402 through passage 440A for passage along channel 400, before it is fed back to nozzle stem 402 though passage 44013. Still other modifications and applications beyond those described will be apparent to those skilled in the art.

The invention claimed is:

1. A fuel manifold for providing fuel to a gas turbine engine fuel nozzle system, the manifold comprising:
    a first fuel conduit defined in the manifold, the conduit extending from a first inlet to a first end and communicating with a plurality of fuel nozzles about the manifold;
    a second fuel conduit defined in the manifold adjacent the first conduit, the conduit extending from a second inlet to a second end and independently communicating with the plurality of fuel nozzles; and
    wherein the conduits are arranged such that fuel flowing in the first conduit travels relative to the manifold in a direction which is different than a fuel flow direction in the second conduit, and at least one of the conduits includes at least one flow rate maintenance member adapted to maintain a desired fuel flow rate in the conduit as fuel volume decreases along the conduit length.

2. The fuel manifold of claim 1 wherein the flow rate maintenance member comprises a portion of the manifold defining the conduit.

3. The fuel manifold of claim 1 wherein at least one of the conduits has a cross-sectional area that varies along a length of the conduit.

4. The fuel manifold of claim 3 wherein the cross-sectional area decreases along the length of the conduit.

5. The fuel manifold of claim 4 wherein the cross-sectional area continuously decreases along the length of the conduit.

6. The fuel manifold of claim 1, wherein the manifold has a ring shape, and wherein fuel in one of the first and second conduits travels clockwise around the manifold and fuel in the other conduit travels counter-clockwise around the manifold.

7. The fuel manifold of claim 6, wherein a cross-sectional area of each conduit is reduced along their respective lengths to thereby maintain a substantially constant fuel flow rate in each conduit.

8. The fuel manifold of claim 1, wherein the flow rate maintenance member includes a sealing member which encloses at least one of the conduits.

9. The fuel manifold of claim 1, wherein a heat shield assembly surrounds the manifold and encloses an air space disposed between the heat shield assembly and the manifold, the air space being sized to provide a predetermined thermal insulation to the manifold.

10. An internal fuel manifold for providing fuel to a gas turbine engine fuel nozzle system, the manifold comprising:
   a first fuel conduit defined in the manifold, the conduit extending from a first inlet to a first end and communicating with a plurality of fuel nozzles about the manifold;
   a second fuel conduit defined in the manifold adjacent the first conduit, the conduit extending from a second inlet to a second end and independently communicating with the plurality of fuel nozzles; and
   wherein the conduits are arranged such that fuel flowing in the first conduit travels relative to the manifold in a direction which is different than a fuel flow direction in the second conduit to thereby improve fuel cooling of the manifold, and a sealing member encloses at least one of the conduits, the sealing member maintaining a desired fuel flow rate in the conduit as fuel volume decreases along the conduit length.

11. The internal fuel manifold of claim 10, wherein a heat shield assembly surrounds the manifold and encloses an air space disposed between the heat shield assembly and the manifold, the air space being sized to provide a predetermined thermal insulation to the manifold.

12. A fuel manifold for providing fuel to a gas turbine engine fuel nozzle system, the manifold comprising:
   a first fuel conduit defined in the manifold, the conduit extending from a first inlet to a first end and communicating with a plurality of fuel nozzles about the manifold;
   a second fuel conduit defined in the manifold adjacent the first conduit, the conduit extending from a second inlet to a second end and independently communicating with the plurality of fuel nozzles; and
   wherein the conduits are arranged such that fuel flowing in the first conduit travels relative to the manifold in a direction which is opposite than a fuel flow direction in the second conduit, and a cross-sectional area of each conduit is reduced along their respective lengths to thereby maintain a substantially constant fuel flow rate in each conduit as fuel volume decreases along each respective length.

13. The fuel manifold of claim 12, wherein the cross-sectional area continuously decreases along the length of each said conduit.

14. The fuel manifold of claim 12, wherein the fuel manifold is an internal fuel manifold having a ring shape, and wherein fuel in one of the first and second conduits travels clockwise around the manifold and fuel in the other conduit travels counter-clockwise around the manifold.

15. The fuel manifold of claim 12, wherein a sealing member encloses at least one of the conduits, the sealing member maintaining the fuel flow rate in the conduit.

16. The fuel manifold of claim 12, wherein a heat shield assembly surrounds the manifold and encloses an air space disposed between the heat shield assembly and the manifold, the air space being sized to provide a predetermined thermal insulation to the manifold.

\* \* \* \* \*